(12) United States Patent
Brown et al.

(10) Patent No.: US 7,476,349 B2
(45) Date of Patent: Jan. 13, 2009

(54) METHOD OF SCHEDULING THE OPEN MOLDING OF AN ARTICLE

(75) Inventors: Charles M. Brown, Jackson, TN (US); Jimmy J. Hildreth, Jackson, TN (US)

(73) Assignee: Aqua Glass Corporation, Adamsville, TN (US)

( * ) Notice: Subject to any disclaimer, the term of this patent is extended or adjusted under 35 U.S.C. 154(b) by 1181 days.

(21) Appl. No.: 10/251,037

(22) Filed: Sep. 20, 2002

(65) Prior Publication Data

US 2004/0056374 A1    Mar. 25, 2004

(51) Int. Cl.
    *B29C 41/52* (2006.01)
(52) U.S. Cl. ............. 264/40.1; 264/297.6; 264/297.7; 700/115; 700/116; 700/117
(58) Field of Classification Search ............. 264/297.1, 264/297.6, 297.7, 36.1; 700/115, 116, 117
    See application file for complete search history.

(56) References Cited

U.S. PATENT DOCUMENTS

| | | | |
|---|---|---|---|
| 3,506,755 A | | 4/1970 | Rudder et al. |
| 3,627,020 A | * | 12/1971 | Taccone ............ 164/131 |
| 3,627,028 A | * | 12/1971 | Carignan ............ 164/323 |
| 3,743,004 A | * | 7/1973 | Becke ............ 164/18 |
| 4,268,219 A | | 5/1981 | Nakagawa et al. |
| 4,325,685 A | * | 4/1982 | Lupke et al. ............ 425/183 |
| 4,690,626 A | | 9/1987 | Krzepinski |
| 4,733,713 A | * | 3/1988 | Kohler ............ 164/18 |
| 4,737,091 A | | 4/1988 | Fiorentini |
| 4,808,057 A | | 2/1989 | Chiappe et al. |
| 4,961,888 A | | 10/1990 | Brown |
| 5,518,105 A | * | 5/1996 | Richard et al. ............ 198/459.1 |
| 5,819,232 A | | 10/1998 | Shipman |
| 5,819,905 A | * | 10/1998 | Lagoutte et al. ............ 198/465.1 |

(Continued)

FOREIGN PATENT DOCUMENTS

DE    227 381 A    9/1985

(Continued)

OTHER PUBLICATIONS

European Search Report, dated Oct. 14, 2003.

*Primary Examiner*—Edmund H. Lee
(74) *Attorney, Agent, or Firm*—Nirav D. Parikh

(57) ABSTRACT

An open mold system provides various unique molds which are released from a plurality of staging queues and loaded onto a mold transportation circuit in relation to a particular customer order and transportation vehicle. A batch of molds are sequenced in an order in which a particular transportation vehicle is to be loaded. After each part is demolded, the molds are returned to their appropriate staging queues or storage areas. The parts are inspected and are sent to either a minor repair area, a major repair area, or directly to a trimming and packaging area. From the packaging area, the parts are moved to a relatively small shipping area where the batch of parts are already ordered to be effectively loaded directly onto the transportation vehicle. As the finished parts come off line in the batch particular to the transportation vehicle, a large shipping area and inventory area is avoided.

20 Claims, 3 Drawing Sheets

U.S. PATENT DOCUMENTS

| | | | |
|---|---|---|---|
| 6,341,271 B1 | 1/2002 | Salvo et al. | |
| 6,350,491 B1 | 2/2002 | Williams | |
| 6,485,286 B1 * | 11/2002 | Hoffmann et al. | 425/183 |
| 6,609,041 B1 * | 8/2003 | Sanka et al. | 700/115 |
| 6,644,951 B2 * | 11/2003 | Lupke et al. | 425/183 |
| 6,896,835 B2 * | 5/2005 | Brown | 264/297.7 |

FOREIGN PATENT DOCUMENTS

| | | |
|---|---|---|
| EP | 0 055 862 A | 7/1982 |
| WO | WO 00 67980 A | 11/2000 |
| WO | WO 03 074246 A | 9/2003 |
| WO | WO 03 074247 A | 9/2003 |

\* cited by examiner

METHOD OF SCHEDULING THE OPEN MOLDING OF AN ARTICLE

BACKGROUND OF THE INVENTION

The present invention relates to an open mold manufacturing process, and more particularly to a manufacturing schedule system in which molds are produced in a sequence exactly to a desired outbound shipping sequence.

Open mold fiberglass reinforced plastic molding systems are well known. Molds typically travel along an assembly line. A plurality of operations are performed at stations along the assembly line until a finished part is removed from the mold at the end of the assembly line. Once demolded, the parts are typically stored in a shipping area such as a loading dock to await loading upon outbound transportation such as a truck. Extra capacity is stored in an inventory. As production often may not exactly meet demand, the inventory may grow rather large requiring a relatively large storage space.

Each unique part requires a particular unique mold. Multiple copies of molds for high demand parts are required to meet particular demands in a given time period. As only a certain number of parts can be produced in a given time period, inventory organization of finished parts and the corresponding molds is paramount. Organization is especially important in a high volume manufacturing environment producing large numbers of unique parts which must be shipped to numerous customers in a "just in time" shipping manner. Typically, a rather large inventory is maintained as a buffer against the potential inability of producing the desired part at the right time and in the right sequence. Inventory is also required as conventional molding facilities may have a rather high scrap rate which effects production of finished parts. Delay in producing a particular part may delay an entire shipment.

Particular customers order particular parts and the parts must be sorted and loaded upon the proper truck. Moreover, to optimize shipping the combination of parts must be arranged in the truck to optimize the "cubing" of the load. That is, proper organization of the parts assures that the truck is fully loaded. Inventory is further maintained as a buffer to assure that the proper parts are always available to properly fill customer requirements in response to truck scheduling and loading.

Accordingly, it is desirable to provide an open mold manufacturing process which meets stringent scheduling requirements without increasing inventory requirements.

SUMMARY OF THE INVENTION

The open mold scheduling system according to the present invention provides various unique molds which are released from a plurality of staging queues and loaded onto a mold transportation circuit in relation to a particular customer order and transportation vehicle.

A sequence of molds or batch are sequenced in an order in which a particular transportation vehicle is to be loaded. That is, the parts which are to loaded furthest into the transportation vehicle (last to be unloaded) are first in the batch while the parts which are to be loaded last into the transportation vehicle (first to be unloaded) are last in the batch sequence. The batch is then transited through the molding operations such that the parts are molded.

After each part is demolded, the molds are returned to their appropriate staging queues or storage areas. The parts are inspected and are sent to either a minor repair area, a major repair area, or directly to a packaging area. From the packaging area, the parts are moved to a relatively small shipping area where the batch of parts are already ordered to be effectively loaded directly onto the transportation vehicle. As the finished parts come off line in the batch particular to the transportation vehicle, a large shipping area and inventory area is avoided.

The present invention therefore provides a manufacturing system which continually delivers finished products in a batch optimized for direct loading upon a transportation vehicle rather than for general placement into an inventory. Moreover, the sequencing and batch output of parts minimizes the requirement for shipping area size and avoids the heretofore necessity of searching and transporting parts from a relatively large inventory to the shipping area. Minimization of handling reduces the potential for damage to the parts. As the system is driven by customer orders, responsiveness to variation in orders and production for "just-in-time" requirements is greatly increased.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
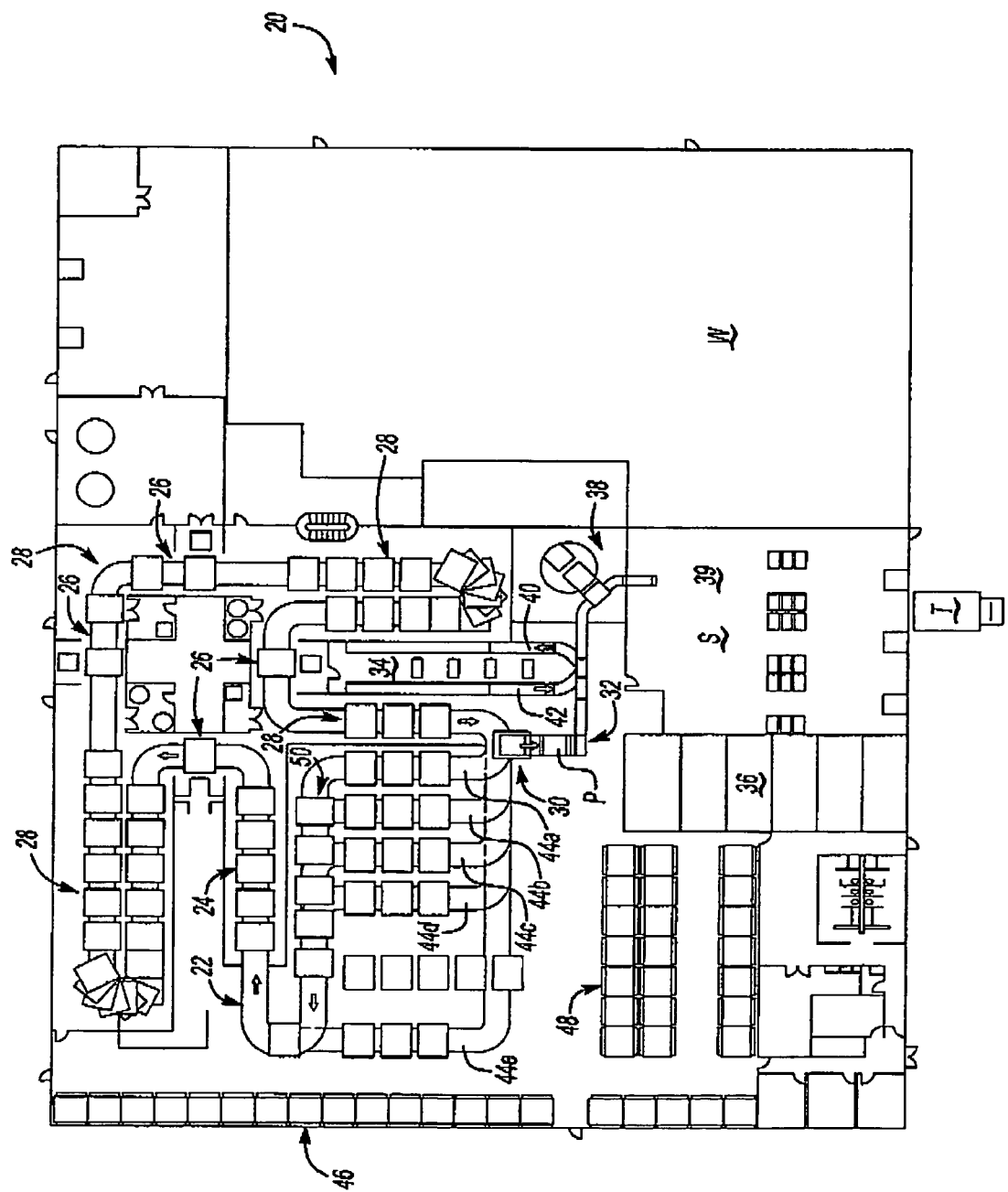
FIG. 1 is a general floor plan view of a mold manufacturing system designed according to the present invention.

FIG. 1 illustrates a factory layout for a mold manufacturing system 20. System 20 is preferably utilized for open molding of large parts, and in particular bath tubs and shower surrounds. The system 20 includes a mold transportation circuit 22 upon which a multiple of molds 24 transit through molding operations. The molds 24 preferably transit along a track inlaid into the manufacturing facility floor such that molds 24 can be added and removed from the mold transportation circuit 22 in a manner of railroad cars. Other transit systems such as conveyors, overhead rails, tracks, guided vehicles and the like will also benefit from the present invention. It should be understood that various mold transportation circuits and manufacturing facilities will benefit from the present invention and that the present invention is not to be limited to on the illustrated manufacturing layout.

The system 20 is separated into Zones in which particular molding operations are performed. The Zones may also be considered replaceable modules such that the present invention is not limited to a defined number of operations, but may be tailored by the addition, subtraction and/or replacement of modules in which other operations are performed. It should be understood that these operations may be performed by robots and/or human workers. Moreover, these Zones may incorporate both automated and human performed operations.

The system 20 is schematically illustrated as generally providing application zones 26 and curing zones 28 which are located along the mold transportation circuit 22 to apply and cure layer(s) of resin referred herein as "gelcoat" and layer(s) of resin/catalyst/fiberglass referred to herein as "chop." The gelcoat, as generally known, is a hardenable resin that becomes the visible surface of the finished product. The "chop" as generally known, adds bulk and structure to the molded part. Extensive details of the molding operations will not be detailed herein as various open mold manufacturing systems such as those disclosed in U.S. patent application Ser. No. 10/087,676, filed Mar. 1, 2002 and Ser. No. 10/146,275 filed May 15, 2002 which are hereby incorporated by reference in their entirety will also benefit from the present invention. It should be understood that although described as a "spray" other methods of application, such as dipping, swabbing, e-coating, or the like will also benefit form the present invention.

Demolding station 30 is where a completed part P is removed or "pulled" from the mold 24, i.e., demolded after it has completed the molding process. After parts P are demolded at demolding station 30, the parts P pass along a part transportation circuit 32 during which the parts are inspected. After inspection, the part transportation circuit 32 alternatively provides for a minor mold repair station 34, a major mold repair station 36, or a direct route to a trimming station 38. After the trimming station 38 the parts are sent to a packaging station 39.

The minor mold repair station 36 is preferably located adjacent a minor repair exit spur 40 from the part transportation circuit 32 to the minor mold repair station 34 and a minor repair entry spur 42 from the minor mold repair station 36 to the part transportation circuit 32. Minor damage to parts is thereby repaired essentially on-line. For major repairs, a transportation device such as a dolly removes the damaged part to the major mold repair station 36 such that more extensive repairs may be undertaken.

After the demolding station 30, the empty molds 24 are sorted back into staging queues 44a, 44b, 44c, 44d and 44e. The staging queues 44a, 44b, 44c, 44d and 44e are preferably spurs which extend from the mold transportation circuit 22. That is, the staging queues 44a, 44b, 44c, 44d and 44e allow the molds 24 to move onto the mold transportation circuit 22 and undergo molding operations at each production zone. Staging queues 44d and 44e preferably provide forklift access such that molds from mold storage areas 46, 48 can be loaded onto queues 44d and 44e and then directed to the mold transportation circuit 22. Like wise, the molds 24 on queues 44d and 44e are also removed at the loading station and returned to the mold storage areas 46, 48 such that various batches of molds can be specifically provided in real time to meet particular customer orders by retrieving particular less utilized molds from the mold storage areas 46, 48. Staging queues 44d and 44e therefore provide infinite variability to the system 20 by allowing the loading and unloading of particular molds 24 to meet customer orders. It should be understood that any number of queues will benefit from the present invention and that high utilization molds may be provided with a multiple of queues which receive the same mold type.

Various unique molds 24 simultaneously transit the mold transportation circuit 22 such that a customer specified mix of parts are produced by the system 20. After the demolding station 30, the molds are sorted by mold type into the appropriate queues 44a, 44b, 44c, 44d and 44e such that queue 44a receives molds 24a, queue 44b receives molds 24b, etc (FIG. 3). If a relatively infrequently utilized mold is required, the desired low utilization mold may be removed from the mold storage areas 46, 48 and loaded into the staging queues 44d and/or 44e that are preferably provide with forklift access (designated schematically at "load.") The molds 24 are therefore staged for release from the queues 44a, 44b, 44c, 44d and 44e and onto a beginning portion 50 of the mold transportation circuit 22 in a batch defined by a controller (logic therefore being schematically illustrated in FIG. 2).

Figure 2:
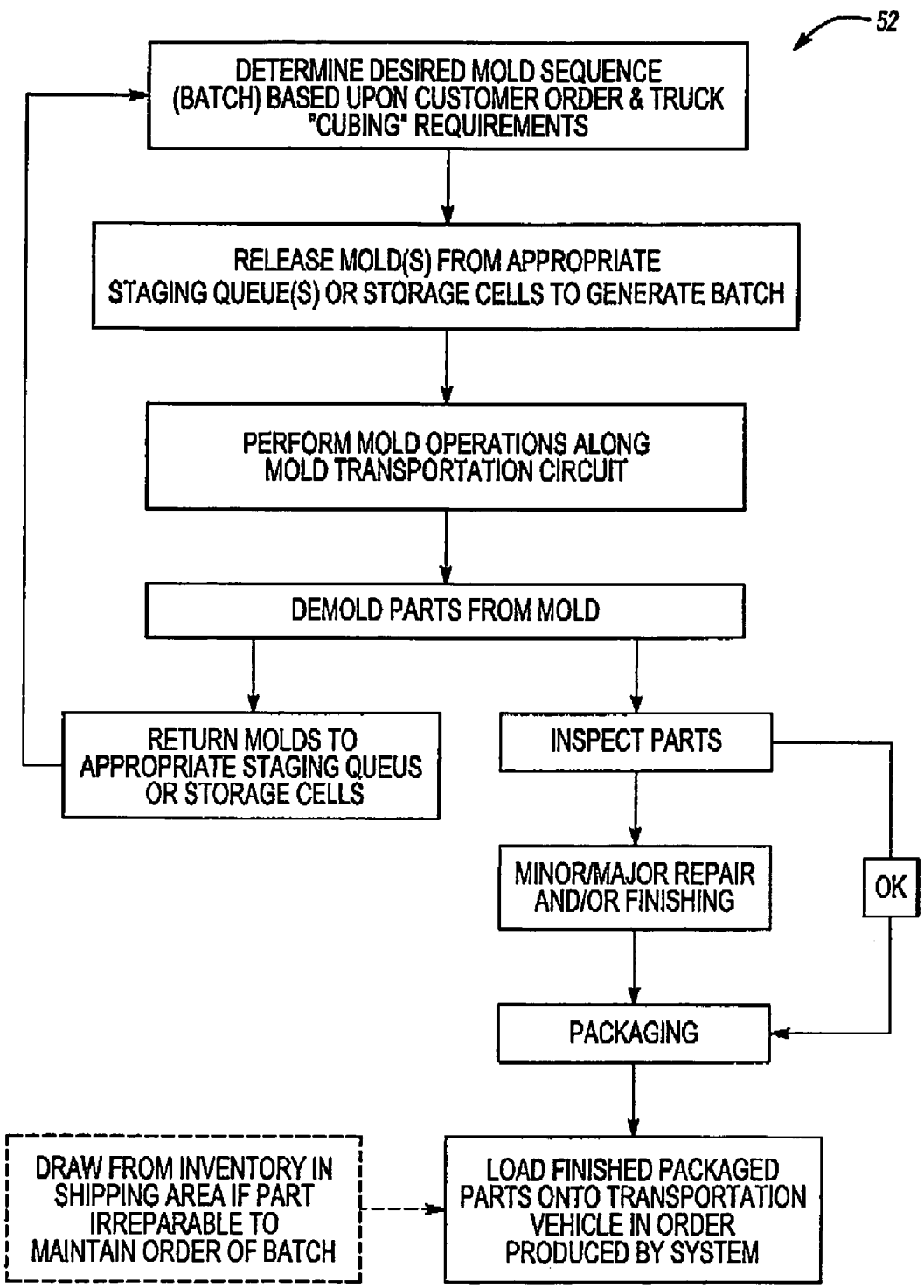
FIG. 2 is a flow chart of a controller which sequences a plurality of molds into a batch for a particular transportation vehicle.
Figure 3:
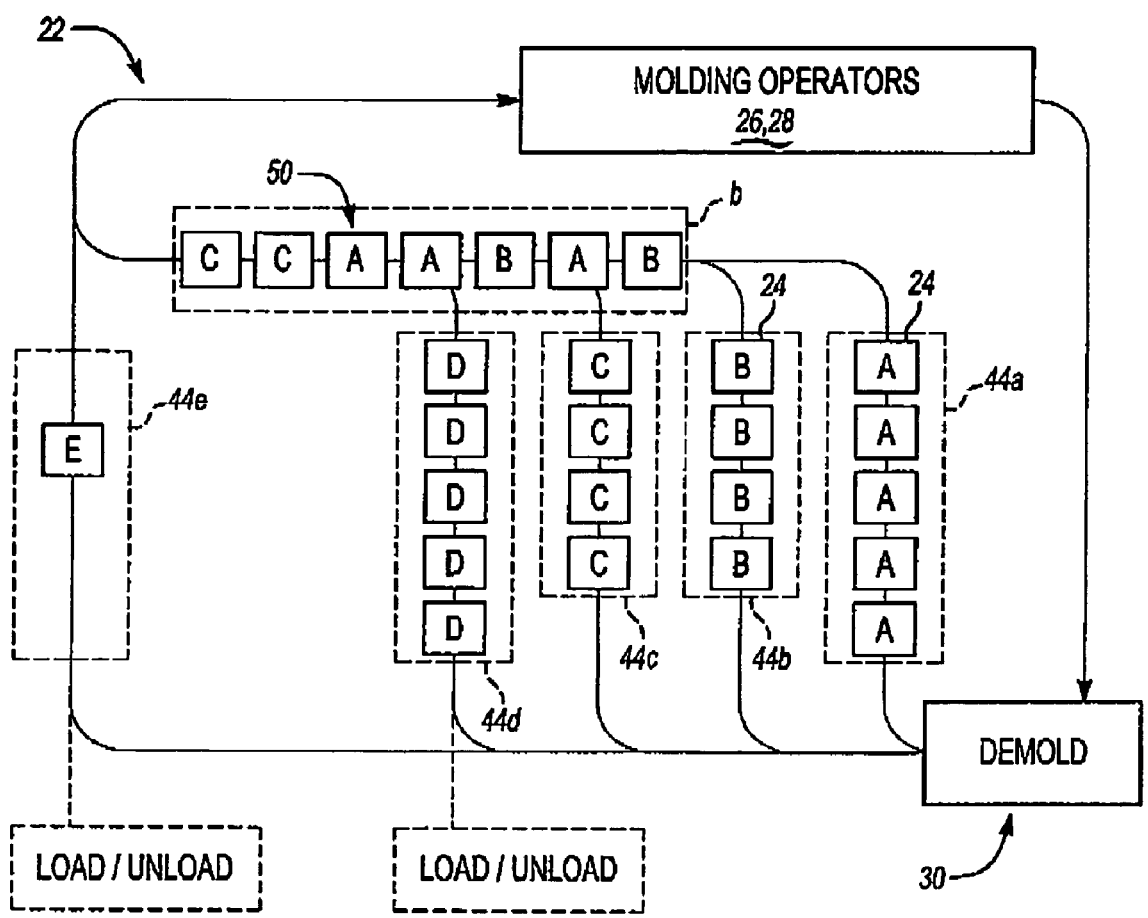
FIG. 3 is a schematic representation of the staging areas and a batch released therefrom.

Referring to FIG. 2, a flowchart illustrates the logic for the controller (illustrated schematically at 52) for the system 20. The various unique molds are preferably released from the queues 44a, 44b, 44c, 44d and 44e loaded onto the mold transportation circuit 22 in a batch b (FIG. 3) in relation to a particular customer order and transportation vehicle load. Moreover, the sequence may be further ordered to efficiently load the transportation vehicle commonly known as efficient "cubing" of the vehicle load.

Each batch b is preferably sequenced in the order in which the particular transportation is to be loaded. That is, the parts which are to be loaded furthest into the transportation vehicle (last to be unloaded) are first in the batch while the parts which are to be loaded last into the transportation vehicle (first to be unloaded) are last in the batch sequence. In this way, even multiple customers may be served by a single transportation vehicle which is appropriately loaded.

The batch is then transited through the molding operations such that the parts are molded. It should be understood that once the first batch has been released into the molding operations and are in production, a next batch is sequenced for the next particular transportation to be loaded to maintain continuous production.

As each part is demolded, the molds are returned to their appropriate staging queues or storage locations. The staging queues may also be utilized for mold preparation as the most recently used molds are located at the end of the queue. A period of time is therefore available to clean and prepare the mold for its next use.

Once the parts are demolded, they are inspected and are sent to either the minor repair area 34, the major repair area 36, or directly to the packaging area 39. From the packaging area, the parts are moved to a relatively small shipping areas (FIG. 1) where the parts are already ordered to be effectively loaded directly onto the transportation vehicle T. A relatively small warehouse W is preferably located directly adjacent the shipping area S to maintain a small inventory.

As the finished parts come off line in the batches particular to the transportation vehicles, a large shipping area and inventory area is avoided. Preferably, the small inventory is maintained to assure that should a part be irreparably damaged or an order requirement exceeds system production capacity for an allotted time, the inventory will operate as a buffer in the conventional sense. However, the inventory required to buffer the present invention is vastly reduced over conventional practice.

The present invention provides a manufacturing system which continually delivers finished products directly to the transportation vehicle rather than into inventory. Moreover, the sequencing and batch output of parts is related directly to the transportation vehicle which minimizes the requirement for shipping area size and avoids the heretofore necessity of searching, handling and transportation of parts from inventory to the shipping area. Minimization of handling reduces the potential for damage to the parts. As the system is driven by customer orders, responsiveness to variation in orders and production for "just-in-time" requirements is greatly increased.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of scheduling the open molding of an article comprising the steps of:
   (1) loading a plurality of open molds onto an open mold transportation circuit in a desired sequence; and
   (2) separating each of the plurality of open molds after demolding into at least a first plurality of open molds comprising a first open mold type in a first staging queue and a second plurality of open molds comprising a second open mold type in a second staging queue.

2. A method as recited in claim 1, wherein said step (1) further comprises arranging the desired sequence in relation to a loading for a transportation vehicle.

3. A method as recited in claim 1, wherein said step (1) further comprises arranging the desired sequence in relation to a loading for a truck.

4. A method as recited in claim 1, wherein said step (1) further comprises arranging the desired sequence in relation to a customer order.

5. A method as recited in claim 1, wherein said step (2) further comprises:
   separating the first plurality of open molds comprising the first open mold type into a first queue; and
   separating the second plurality of open molds comprising the second open mold type into a second queue.

6. A method as recited in claim 5, further comprising the steps of:
   loading at least one of the first open mold type from the first queue onto the open mold transportation circuit in accordance with the desired sequence; and
   loading at least one of the second open mold type from the second queue onto the open mold transportation circuit in accordance with the desired sequence.

7. A method of scheduling the open molding of an article comprising the steps of:
   (1) loading at least one of a first open mold type from a first staging queue onto an open mold transportation circuit in accordance with a desired sequence;
   (2) loading at least one of a second open mold type from a second staging queue onto the open mold transportation circuit in accordance with the desired sequence;
   (3) removing at least one open mold from the transportation circuit;
   (4) separating each of the first open mold type after demolding from the open mold transportation circuit into the first staging queue along the open mold transportation circuit; and
   (5) separating each of the second open mold type after demolding from the open mold transportation circuit into the second staging queue along the open mold transportation circuit.

8. A method as recited in claim 7, further comprising the step of:
   arranging the desired sequence in relation to a loading for a transportation vehicle.

9. A method as recited in claim 7, further comprising the step of:
   arranging the desired sequence in relation to a loading for a truck.

10. A method as recited in claim 7, further comprising the step of:
    (a) inspecting parts demolded in said step (3);
    (b) packaging parts after said inspecting step; and
    (c) directly loading a transportation vehicle with parts after said packaging step.

11. A method as recited in claim 10, further comprising the step of:
    repairing a part prior to said step (b).

12. A method as recited in claim 7, further comprising the step of:
    (a) loading at least one of a third open mold type from a source external to the open mold transportation circuit onto a third queue in accordance with the desired sequence;
    (b) transiting the at least one of a third open mold type along the open mold transportation circuit; and
    (c) separating each of the third open mold type from the open mold transportation circuit into the third queue after said step (b).

13. A method as recited in claim 12, further comprising the step of:
    (d) removing at least one of a third open mold type from a storage area to the third queue prior to said step (a).

14. A method as recited in claim 12, further comprising the step of:
    (d) removing the third open mold type from the third queue after said step (c) to a storage area.

15. A method as recited in claim 1, further comprising the steps of:
    (3) transiting the first open mold type to the first open mold staging queue and the second open mold type to the second open mold staging queue, the first open mold staging queue generally parallel to the second open mold staging queue.

16. A method as recited in claim 7, further comprising the steps of:
    (6) transiting the first open mold type to the first open mold staging queue and the second open mold type to the second open mold staging queue, the first open mold staging queue generally parallel to the second open mold staging queue.

17. A method as recited in claim 1, further comprising the step of:
    (3) transiting the open molds directly to a packaging area.

18. A method as recited in claim 1, wherein said step (1) further comprises arranging the desired sequence in relation to a customer order prior to a molding operation.

19. A method as recited in claim 1, wherein said step (1) further comprises:
    arranging the desired sequence in relation to a customer order and in relation to a loading for a transportation vehicle.

20. A method as recited in claim 1, wherein said step (1) further comprises:
    arranging the desired sequence in relation to a customer order and in relation to a loading for a transportation vehicle to efficiently load the transportation vehicle according to a "cubing" of the vehicle load.

* * * * *